United States Patent
Yang et al.

(10) Patent No.: US 12,466,911 B2
(45) Date of Patent: Nov. 11, 2025

(54) AQUEOUS DISPERSION OF MULTISTAGE POLYMERIC PARTICLES AND PROCESS FOR PREPARING THE SAME

(71) Applicant: Dow Global Technologies LLC, Midland, MI (US)

(72) Inventors: Xiaohong Yang, Shanghai (CN); Jinfei Wang, Shanghai (CN); Fengzhe Shi, Shanghai (CN); Juan Zhao, Shanghai (CN); Yawei Xu, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 455 days.

(21) Appl. No.: 17/925,772

(22) PCT Filed: Jun. 28, 2020

(86) PCT No.: PCT/CN2020/098492
§ 371 (c)(1),
(2) Date: Nov. 16, 2022

(87) PCT Pub. No.: WO2022/000126
PCT Pub. Date: Jan. 6, 2022

(65) Prior Publication Data
US 2023/0220141 A1    Jul. 13, 2023

(51) Int. Cl.
*C08F 265/06* (2006.01)
*C09D 5/02* (2006.01)
*C09D 133/12* (2006.01)
*C09D 151/00* (2006.01)

(52) U.S. Cl.
CPC .............. *C08F 265/06* (2013.01); *C09D 5/02* (2013.01); *C09D 133/12* (2013.01); *C09D 151/003* (2013.01)

(58) Field of Classification Search
CPC .... C09D 5/02; C09D 133/12; C09D 151/003; C08F 265/06
See application file for complete search history.

(56) References Cited

U.S. PATENT DOCUMENTS

| | | | |
|---|---|---|---|
| 4,215,195 A | 7/1980 | Ponticello et al. | |
| 5,889,098 A | 3/1999 | Trumbo | |
| 6,300,411 B1 | 10/2001 | Seko et al. | |
| 8,772,386 B2 | 7/2014 | Xu et al. | |
| 9,951,169 B2 | 4/2018 | Yang et al. | |
| 10,487,166 B2 | 11/2019 | Yang et al. | |
| 11,124,670 B2 | 9/2021 | Chen et al. | |
| 2002/0013405 A1 | 1/2002 | Sakaguchi et al. | |
| 2002/0147262 A1 | 10/2002 | Kriessmann et al. | |
| 2003/0224184 A1 | 12/2003 | Hermes et al. | |
| 2015/0099843 A1 | 4/2015 | Hartig et al. | |

FOREIGN PATENT DOCUMENTS

| | | |
|---|---|---|
| CN | 105367698 A | 3/2016 |
| WO | 1993016133 A2 | 8/1993 |
| WO | 2011078224 A1 | 6/2011 |
| WO | 2014060456 A2 | 4/2014 |
| WO | 2020010510 A1 | 1/2020 |

OTHER PUBLICATIONS

Taylor, "Synthesis and Properties of Poly[N-(1-1-dimethyl-3-oxobutyl)acrylamide oxime]", Macromolecules. 1983, vol. 16, No. 10, pp. 1561-1563.
Vardareli, "Polymerization and Characterization of Allyl Methacrylate", Department of Polymer Science and Technology, 2006, pp. 1-83.

*Primary Examiner* — Patrick D Niland
(74) *Attorney, Agent, or Firm* — CANTOR COLBURN LLP

(57) ABSTRACT

An aqueous dispersion of multistage polymeric particles comprising at least two polymers, a process for preparing the aqueous dispersion of multistage polymeric particles; and an aqueous coating composition comprises such aqueous dispersion of multistage polymeric particles providing coatings with hot resistance, alcohol resistance, alkali resistance and acetic acid resistance.

16 Claims, No Drawings

AQUEOUS DISPERSION OF MULTISTAGE POLYMERIC PARTICLES AND PROCESS FOR PREPARING THE SAME

FIELD OF THE INVENTION

The present invention relates to an aqueous dispersion of multistage polymeric particles and a process for preparing the same.

INTRODUCTION

Aqueous or waterborne coating compositions are widely used in industrial and architectural applications as they contribute less volatile organic compounds (VOCs), but still suffer from limitations such as insufficient water resistance and chemical resistance such as resistance to alcohol, acetic acid, and alkali, as compared to solvent-borne coating compositions. It is particularly challenging for waterborne coating compositions including one-component or two-component waterborne coating compositions to provide coatings made therefrom with hot water resistance. For example, some applications such as coatings for kitchen furniture and dining tables require coatings' resistance to damages after exposure to hot water (that is, water at 70 degrees Celsius (° C.)) or higher), particularly, boiling water.

Therefore, it is desirable to provide an aqueous polymer dispersion, particularly suitable for use in aqueous coating compositions that can provide coatings with resistance to hot water while achieving above good chemical resistance to alcohol, acetic acid, and alkali.

SUMMARY OF THE INVENTION

The present invention provides a novel aqueous dispersion of multistage polymeric particles that is particularly suitable for coating applications. An aqueous coating composition comprising such aqueous dispersion of multistage polymeric particles provides coatings made therefrom with excellent hot resistance with a rating of 4 or higher while achieving good chemical resistance including alcohol resistance rated as 4 or higher, alkali resistance rated as 4 or higher, and acetic acid resistance rated as 3 or higher. These properties may be measured according to the test methods described in the Examples section below.

In a first aspect, the present invention is an aqueous dispersion of multistage polymeric particles, wherein the multistage polymeric particles comprise, by weight based on the weight of the multistage polymeric particles, from 38% to 58% of a polymer A with a glass transition temperature of greater than 47° C. and from 42% to 62% of a polymer B with a glass transition temperature of 40° C. or less, wherein the polymer A comprises, by weight based on the weight of the polymer A, structural units of a multifunctional monomer containing two or more different ethylenically unsaturated polymerizable groups, from zero to 6% of structural units of diacetone (meth)acrylamide, structural units of monoethylenically unsaturated nonionic monomer; and optionally, structural units of an acid monomer and/or a salt thereof selected from the group consisting of methacrylic acid, a phosphorous-containing acid monomer or a salt thereof, or mixtures thereof; and wherein the polymer B comprises, by weight based on the weight of the polymer B, from 1.1% to 15% of structural units of diacetone (meth)acrylamide, structural units of an acid monomer and/or a salt thereof selected from the group consisting of methacrylic acid, a phosphorous-containing acid monomer or a salt thereof, or mixtures thereof, and structural units of a monoethylenically unsaturated nonionic monomer; and wherein the multistage polymeric particles comprise, by weight based on the weight of the multistage polymeric particles, structural units of the acid monomer and salt thereof in a total amount of from 0.1% to 3.9% and structural units of the multifunctional monomer in a total amount of greater than 1.5% to 5%.

In a second aspect, the present invention is a process for preparing the aqueous dispersion of multistage polymeric particles by multistage free-radical polymerization, comprising at least one stage of polymerization forming a polymer A and at least one stage of polymerization forming a polymer B to form the multistage polymeric particles.

In a third aspect, the present invention is an aqueous coating composition comprising the aqueous dispersion of the first aspect.

DETAILED DESCRIPTION OF THE INVENTION

"Acrylic" in the present invention includes (meth)acrylic acid, alkyl (meth)acrylate, (meth)acrylamide, (meth)acrylonitrile and their modified forms such as hydroxyalkyl (meth)acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

As used herein, the term structural units, also known as polymerized units, of the named monomer refers to the remnant of the monomer after polymerization, or the monomer in polymerized form. For example, a structural unit of methyl methacrylate is as illustrated:

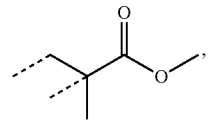

where the dotted lines represent the points of attachment of the structural unit to the polymer backbone.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Glass transition temperature" (Tg) in the present invention can be measured by various techniques including, for example, differential scanning calorimetry (DSC) or calculation by using the following equation, for example, for calculating the Tg of a copolymer of monomers $M_a$, $M_b$ and $M_c$, $$Tg = W_a * Tg_a + W_b * Tg_b + W_c * Tg_c$$

wherein $T_g$ is the glass transition temperature calculated for the copolymer, $W_a$ is the weight fraction of monomer $M_a$ in the copolymer, $W_b$ is the weight fraction of monomer $M_b$ in the copolymer, $W_c$ is the weight fraction of monomer $M_c$ in the copolymer, $Tg_a$ is the glass transition temperature of the homopolymer of monomer $M_a$, $Tg_b$ is the glass transition temperature of the homopolymer of monomer $M_b$, and $Tg_c$ is the glass transition temperature of the homopolymer of monomer $M_c$; all temperatures being in ° C. Linear Tgs of some commonly used monomer are summarized in the following table:

| Monomer | Tg of homopolymer (° C.) |
| --- | --- |
| Methyl methacrylate | 83 |
| Butyl acrylate | −45 |
| Butyl methacrylate | 20 |
| 2-Ethylhexyl acrylate | −65 |
| Styrene | 83 |
| Methacrylic acid | 155 |
| Acrylic acid | 110 |
| Phosphoethyl methacrylate | 100 |
| Diacetone acrylamide | 85* |
| Allyl methacrylate | 94** |

*Macromolecules. 1983, 16(10), pages 1561-1563;
**A thesis submitted to the Graduate School of Natural and Applied Sciences of Middle East Technical University, Tugba Vardareli, Polymerization and Characterization of Allyl Methacrylate, 2006

"Multistage polymeric particles" herein means polymeric particles prepared by the sequential addition of two or more different monomer compositions, comprising at least two polymers including a polymer A and a polymer B. By "polymer A" (also as "first stage polymer") and "polymer B" (also as "the second stage polymer") mean these polymers having different compositions and formed in different stages of multistage free-radical polymerization in preparing the multistage polymeric particles.

The polymer A and/or the polymer B in the multistage polymeric particles, preferably the polymer B, may each independently comprise structural units of one or more acid monomer, a salt thereof, or mixtures thereof. The acid monomer and/or salt thereof is selected from the group consisting of methacrylic acid, a phosphorous-containing acid monomer or a salt thereof, or mixtures thereof. Phosphorous-containing acid monomers can be ethylenically unsaturated phosphorous acid-containing monomers including, for example, dihydrogen phosphate esters of an alcohol in which the alcohol contains or is substituted with a polymerizable vinyl or olefinic group. Suitable phosphorous acid-containing monomers and salts thereof may include, for example, phosphoalkyl (meth)acrylates such as phosphoethyl (meth)acrylate, phosphopropyl (meth)acrylate, phosphobutyl (meth)acrylate, salts of phosphoalkyl (meth)acrylates, or mixtures thereof; $CH_2=C(R)-C(O)-O-(R_pO)_n-P(O)(OH)_2$, wherein R=H or $CH_3$ and $R_p$=alkyl, n is from 1 to 20, such as SIPOMER PAM-100, SIPOMER PAM-200, SIPOMER PAM-300, and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho dipropylene glycol (meth)acrylate, phospho tri-propylene glycol (meth)acrylate, allyl ether phosphate, salts thereof, or mixtures thereof. Preferred ethylenically unsaturated phosphorous acid-containing monomers and salts thereof are selected from the group consisting of phosphoethyl (meth)acrylate, phosphopropyl (meth)acrylate, phosphobutyl (meth)acrylate, salts thereof, or mixtures thereof; more preferably, phosphoethyl methacrylate (PEM). The multistage polymeric particles may comprise structural units of the acid monomer and salt thereof in a total amount of 0.1% or more, 0.2% or more, 0.3% or more, 0.4% or more, 0.5% or more, 0.6% or more, 0.7% or more, 0.8% or more, 0.9% or more, 1.0% or more, 1.1% or more, 1.2% or more, 1.3% or more, 1.4% or more, or even 1.5% or more, and at the same time, 3.9% or less, 3.8% or less, 3.7% or less, 3.6% or less, 3.5% or less, 3.4% or less, 3.3% or less, 3.2% or less, 3.1% or less, or even 3.0% or less, by weight based on the weight of the multistage polymeric particles. The polymer A in the multistage polymeric particles may comprise structural units of the acid monomer and salt thereof in an amount of zero or more, 0.1% or more, 0.2% or more, 0.5% or more, 0.8% or more, 1.2% or more, 1.5% or more, or even 1.8% or more, and at the same time, 3% or less, 2.8% or less, 2.5% or less, 2.3% or less, 2.1% or less, or even 2.0% or less, by weight based on the weight of the polymer A. The polymer B in the multistage polymeric particles may comprise structural units of the acid monomer and salt thereof in an amount of 0.2% or more, 0.5% or more, 0.8% or more, 1.0% or more, 1.2% or more, 1.5% or more, 1.8% or more, 2.0% or more, 2.2% or more, 2.5% or more, 2.8% or more, or even 3.0% or more, and at the same time, 5.5% or less, 5.2% or less, 5.0% or less, 4.8% or less, 4.5% or less, 4.3% or less, or even 4.0% or less, by weight based on the weight of the polymer B.

The polymer A and/or the polymer B in the multistage polymeric particles, preferably the polymer B, may each independently comprise structural units of diacetone (meth)acrylamide, preferably diacetone acrylamide (DAAM). The polymer A may optionally comprise structural units of diacetone (meth)acrylamide in an amount of zero or more, 0.1% or more, 0.2% or more, 0.3% or more, or even 0.5% or more, and at the same time, 6% or less, 5% or less, 4% or less, 3% or less, 2% or less, 1.5% or less, 1.1% or less, or even 1% or less, by weight based on the weight of the polymer A. The polymer B may comprise structural units of diacetone (meth)acrylamide in an amount of 1.1% or more, 1.2% or more, 1.3% or more, 1.4% or more, 1.5% or more, 1.6% or more, 1.7% or more, 1.8% or more, 1.9% or more, 2.0% or more, 2.2% or more, 2.4% or more, 2.5% or more, 2.8% or more, 3.0% or more, 3.2% or more, 3.5% or more, 3.8% or more, 4% or more, 4.2% or more, 4.5% or more, 4.8% or more, or even 5% or more, at the same time, 15% or less, 14% or less, 13% or less, 12% or less, 11% or less, 10% or less, 9% or less, 8% or less, 7% or less, or even 6% or less, by weight based on the weight of the polymer B. Structural units of diacetone (meth)acrylamide may be present in the multistage polymeric particles in a total amount of greater than 0.6%, for example, 0.7% or more, 0.8% or more, 1.0% or more, 1.2% or more, 1.5% or more, 1.8% or more, 2.0% or more, or even 2.2% or more, and at the same time, 10% or less, 9% or less, 8% or less, 7% or less, 6% or less, 5% or less, 4% or less, or even 3.5% or less, by weight based on the weight of the multistage polymeric particles.

The polymer A and/or the polymer B in the multistage polymeric particles, preferably the polymer A, may each independently comprise structural units of one or more multifunctional monomer containing two or more different ethylenically unsaturated polymerizable groups. The two or more different ethylenically unsaturated polymerizable groups usually have different reactivity. Each of the ethylenically unsaturated polymerizable groups may be selected from one of but different categories (i), (ii), (iii) and (iv): (i) an acryl group, (ii) a methacryl group, (iii) an allyl group ($H_2C=CH-CH_2-$), and (iv) an additional ethylenically unsaturated group that is other than (i), (ii), and (iii). The acryl group may be an acryloxy group or an acrylamino group. The methacryl group may include a methacryloxy group or a methacrylamino group. The additional ethylenically unsaturated group may include a vinyl group, a maleate group, a crotyl group, or a dicyclopentenyl group. Preferably, the multifunctional monomer contains at least one allyl group and at least one acryl or methacryl group. Suitable multifunctional monomers may include, for example, allyl (meth)acrylate, allyl (meth)acrylamide, allyl oxyethyl (meth)acrylate, crotyl (meth)acrylate, dicyclopentenyl (meth)acrylate, dicyclopentenyl ethyl (meth)acrylate, diallyl maleate, or mixtures thereof. The multistage polymeric particles may comprise structural units of the multifunctional monomer in a total amount of greater than 1.5%, for example, 1.6% or more, 1.7% or more, 1.8% or more, 1.9% or more, 2.0% or more, 2.1% or more, 2.2% or more, 2.3% or more, 2.4% or more, or even 2.5% or more, and at the same time, 5% or less, 4.9% or less, 4.8% or less, 4.7% or less, 4.6% or less, 4.5% or less, 4.4% or less, 4.3% or less, 4.2% or less, 4.1% or less, 4% or less, 3.9% or less, 3.8% or less, 3.7% or less, 3.6% or less, 3.5% or less, 3.4% or less, 3.3% or less, 3.2% or less, 3.1% or less, or even 3.0% or less, by weight based on the weight of the multistage polymeric particles. The polymer A may comprise structural units of the multifunctional monomer in an amount of 3.1% or more, 3.2% or more, 3.3% or more, 3.4% or more, 3.5% or more, 3.6% or more, 3.8% or more, 4.0% or more, 4.2% or more, or even 4.5% or more, and at the same time, 12% or less, 11% or less, 10% or less, 9% or less, 8% or less, 7% or less, 6.5% or less, 6% or less, 5.5% or less, or even 5% or less, by weight based on the weight of the polymer A. The polymer B may comprise structural units of the multifunctional monomer in an amount of from zero to 2.0%, for example, less than 1.5%, less than 1.2%, less than 1.0%, less than 0.8%, less than 0.5%, less than 0.3%, less than 0.2%, less than 0.1%, less than 0.08%, less than 0.05%, less than 0.04%, less than 0.02%, less than 0.01%, or even zero, by weight based on the weight of the polymer B.

The multistage polymeric particles of the present invention may also comprise structural units of one or more monoethylenically unsaturated nonionic monomer that is other than diacetone (meth)acrylamide. The structural units of the monoethylenically unsaturated nonionic monomer may be present in the polymer A, the polymer B, or in both the polymer A and B. As used herein, the term "nonionic monomer" refers to a monomer that does not bear an ionic charge between pH=1-14. The monoethylenically unsaturated nonionic monomer may comprise any one or any combination of more than one type of monomer selected from alkyl esters of (meth)acrylic acids, vinyl aromatic monomers such as styrene and substituted styrene, vinyl esters of carboxylic acid, (meth)acrylamide, ethylenically unsaturated nitriles such as (meth)acrylonitrile, (meth)acryl functional silanes such as (meth)acryloxyalkyltrialkoxysilanes, vinyl silanes such as vinyltrialkoxysilanes, or mixtures thereof. Alkyl esters of (meth)acrylic acids useful in the present invention can be $C_1$-$C_{20}$-, $C_1$-$C_{10}$-, or $C_1$-$C_8$-alkyl esters of (meth)acrylic acids including, for example, methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl (meth)acrylate, oleyl(meth)acrylate, palmityl (meth)acrylate, nonyl(meth)acrylate, decyl (meth)acrylate, dodecyl (meth)acrylate, pentadecyl (meth) acrylate, hexadecyl (meth)acrylate, octadecyl (meth)acrylate, hydroxyethyl (meth)acrylate, or hydroxypropyl (meth)acrylate, or mixtures thereof. The vinyl silanes useful in the present invention may comprise any one or any combination of more than one type of monomer selected from alkylvinyldialkoxysilanes, vinyltriethoxysilane, vinyltrimethoxysilane, or mixtures thereof. The (meth)acryl functional silanes useful in the present invention may comprise any one or any combination of more than one type of monomer selected from gamma-methacryloxypropyltrimethoxysilane, methacryloxypropyltriethoxysilane, 3-methacryloxypropylmethyldimethoxysilane, 3-methacryloxypropyltrimethoxysilane, 3-methacryloxypropyltriethoxysilane, or mixtures thereof. Preferably, the monoethylenically unsaturated nonionic monomer is selected from the group consisting of methyl methacrylate, methacrylate, ethyl acrylate, butyl methacrylate, butyl acrylate, 2-ethylhexyl acrylate, styrene, or mixtures thereof. The multistage polymeric particles may comprise structural units of the monoethylenically unsaturated nonionic monomer in a total amount of 80% or more, 82% or more, 85% or more, 87% or more, 89% or more, or even 89.5% or more, and at the same time, 97.8% or less, 96% or less, 95% or less, 94% or less, or even 93.5% or less, by weight based on the weight of the multistage polymeric particles.

Preferably, the polymer A in the multistage polymeric particles comprises structural units of the acid monomer and/or salt thereof, structural units of the multifunctional monomer such as allyl methacrylate, structural units of the monoethylenically unsaturated nonionic monomer, and optionally, structural units of diacetone (meth)acrylamide. More preferably, the polymer A comprises, by weight based on the weight of the polymer A, from 1% to 3% of structural units of the acid monomer and salt thereof, from 4% to 6% of structural units of the multifunctional monomer, from 89% to 95% of structural units of the monoethylenically unsaturated nonionic monomer, and from zero to 2% of structural units of diacetone (meth)acrylamide.

Preferably, the polymer B in the multistage polymeric particles comprises structural units of the acid monomer and/or salt thereof, structural units of the monoethylenically unsaturated nonionic monomer, and structural units of diacetone (meth)acrylamide. More preferably, the polymer B comprises, by weight based on the weight of the polymer B, from 3% to 5% of structural units of the acid monomer and salt thereof, from 87% to 94% of structural units of the monoethylenically unsaturated nonionic monomer, and from 3% to 8% of structural units of diacetone (meth)acrylamide.

The multistage polymeric particles of the present invention may comprise, by weight based on the weight of the multistage polymeric particles, from 2% to 3.5% of structural units of the acid monomer and salt thereof, from 1.5% to 3.5% of structural units of diacetone (meth)acrylamide, from 2.0% to 3.0% of structural units of the multifunctional monomer, and from 90% to 94.5% of structural units of the monoethylenically unsaturated nonionic monomer.

The multistage polymeric particles of the present invention comprise the polymer A and the polymer B. The polymer A in the multistage polymeric particles may be present in an amount of 38% or more, 38.5% or more, 39% or more, 39.5% or more, 40% or more, 41% or more, 42% or more, 43% or more, 44% or more, or even 45% or more, and at the same time, 58% or less, 57% or less, 56% or less, 55% or less, 54% or less, 53% or less, 52% or less, 51% or less, or even 50% or less, by weight based on the weight of the multistage polymeric particles. The polymer B in the multistage polymeric particles may be present in an amount of 42% or more, 43% or more, 44% or more, 45% or more, 46% or more, 47% or more, 48% or more, 49% or more, or even 50% or more, and at the same time, 62% or less, 61.5% or less, 61% or less, 60.5% or less, 60% or less, 59% or less, 58% or less, 57% or less, 56% or less, or even 55% or less, by weight based on the weight of the multistage polymeric particles. The multistage polymeric particles can be two-stage polymeric particles, where the total weight concentration of the polymer A and the polymer B in the multistage polymeric particles is equal to 100%.

The multistage polymeric particles of the present invention may comprise multiple different phases or layers, which are formed by at least the polymer A and the polymer B. The multistage polymeric particles may comprise two layers such as an inner layer of the polymer A and an outer layer of the polymer B.

Types and levels of the monomers described above may be chosen to provide the multistage polymeric particles with a Tg suitable for different applications. The multistage polymeric particles may have a Tg of 0° C. or more, 2° C. or more, 5° C. or more, 8° C. or more, 10° C. or more, 12° C. or more, 15° C. or more, 18° C. or more, 20° C. or more, 22° C. or more, 25° C. or more, or even 30° C. or more, and at the same time, 70° C. or less, 68° C. or less, 65° C. or less, 62° C. or less, 60° C. or less, 58° C. or less, 55° C. or less, 50° C. or less, or even 45° C. or less. The polymer A in the multistage polymeric particles may have a Tg of greater than 47° C. or more, for example, 48° C. or more, 49° C. or more, 50° C. or more, 51° C. or more, or even 52° C. or more, and at the same time, 100° C. or less, 95° C. or less, 90° C. or less, 85° C. or less, 80° C. or less, 75° C. or less, 72° C. or less, 70° C. or less, 68° C. or less, 67° C. or less, 65° C. or less, 62° C. or less, or even 60° C. or less. The polymer B in the multistage polymeric particles may have a Tg of 40° C. or less, for example, 38° C. or less, 35° C. or less, 32° C. or less, 30° C. or less, 28° C. or less, or even 25° C. or less, and at the same time, −10° C. or more, −9° C. or more, −8° C. or more, −7° C. or more, −6° C. or more, −5° C. or more, −4° C. or more, −3° C. or more, −2° C. or more, −1° C. or more, 0° C. or more, 1° C. or more, 2° C. or more, 3° C. or more, 4° C. or more, 5° C. or more, 6° C. or more, 7° C. or more, 8° C. or more, 9° C. or more, or even 10° C. or more. Tgs are calculated by the equation described above.

The multistage polymeric particles in the aqueous dispersion of the present invention may have an average particle size of 50 nanometers (nm) or more, 80 nm or more, 90 nm or more, and at the same time, 500 nm or less, 300 nm or less, or even 200 nm or less. The particle size herein refers to the number average particle size and may be measured by a Brookhaven BI-90 Plus Particle Size Analyzer.

In addition to the multistage polymeric particles, the aqueous dispersion of the present invention may further comprise one or more polyfunctional carboxylic hydrazide containing at least two hydrazide groups per molecule. The polyfunctional carboxylic hydrazide may act as a crosslinker and may be selected from the group consisting of adipic dihydrazide, oxalic dihydrazide, isophthalic dihydrazide, polyacrylic polyhydrazides, or mixtures thereof. The polyfunctional carboxylic hydrazide may be present in an amount of zero or more, 0.05% or more, 0.1% or more, 0.2% or more, or even 0.5% or more, and at the same time, 10% or less, 7% or less, 5% or less, 2% or less, or even 1% or less, by weight based on the weight of the multistage polymeric particles.

The aqueous dispersion of multistage polymeric particles of the present invention further comprises water. Water may be present in an amount of 30% or more, 40% or more, or even 50% or more, and at the same time, 90% or less, 85% or less, or even 80% or less, by weight based on the total weight of the aqueous dispersion.

The present invention also relates to a process for preparing the aqueous dispersion comprising the multistage polymeric particles by multistage free-radical polymerization, comprising at least one stage of polymerization forming the polymer A and at least one stage of polymerization forming the polymer B. In the multistage free-radical polymerization, at least two stages are formed sequentially, which usually results in the formation of the multistage polymeric particles comprising at least two polymer compositions such as the polymer A and the polymer B, optionally different stages can be formed in different reactors. Each of the stages is sequentially polymerized and different from the immediately preceding and/or immediately subsequent stage by a difference in monomer composition. The multistage free-radical polymerization may include at least one stage of forming the polymer A by polymerization of a monomer mixture A in the first stage, followed by forming the polymer B by polymerization of a monomer mixture B in the second stage in the presence of the polymer A obtained from the first stage. Alternatively, the multistage free-radical polymerization may include forming the polymer B by polymerization of the monomer mixture B in the first stage, followed by forming the polymer A by polymerization of the monomer mixture A in the second stage in the presence of the previously formed polymer B. Each stage of the free-radical polymerization can be conducted by polymerization techniques well known in the art such as suspension polymerization or emulsion polymerization of monomers such as the monomer mixtures A and B. Emulsion polymerization is a preferred process. A monomer composition A and a monomer composition B may each independently include the monomers described above for forming the structural units of the polymer A and the polymer B, respectively. Total concentration of the monomers in the monomer mixture A for preparing the polymer A is equal to 100%. Total concentration of the monomers in the monomer mixture B is equal to 100%. For each monomer, the weight concentration of a monomer in total monomers used in preparing a polymer (e.g., the polymer A) is substantially the same as the above described weight concentration of structural units of such monomer in such polymer (e.g., the polymer A) as described above, for example, the weight concentration of each monomer in the monomer mixture A (that is, based on the total weight of the monomer mixture A) are the same as the weight concentration of structural units of such monomer in the polymer A (that is, based on the weight of the polymer A). The monomer mixtures A and B for preparing the polymer A and the polymer B, respectively, may be added neat or as an emulsion in water; or added in one or more addition or continuously, linearly or nonlinearly, over the reaction period of preparing the polymer A, the polymer B, respectively, or combinations thereof. Temperature suitable for emulsion polymerization processes may be lower than 100° C., in the range of from 30 to 95° C., or in the range of from 50 to 90° C.

In the multistage free-radical polymerization process for preparing the aqueous dispersion of the multistage polymeric particles, one or more free radical initiator may be used in each stage. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers used for preparing the multistage polymer. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process for preparing the aqueous dispersion of the multistage polymeric particles, one or more surfactant may be used in one or more stage of the polymerization process. The surfactant may be added prior to or during the polymerization of the monomers, or combinations thereof. A portion of the surfactant can also be added after the polymerization. Surfactants may be used for at least one stage or all stages of preparing the multistage polymeric particles. The surfactants may include anionic and/or nonionic emulsifiers. The surfactants can be reactive surfactants such as polymerizable surfactants. Examples of suitable surfactants include alkali metal or ammonium salts of alkyl, aryl, or alkylaryl sulfates, sulfonates or phosphates; alkyl sulfonic acids; sulfosuccinate salts; fatty acids; and ethoxylated alcohols or phenols. Preferably, the alkali metal or ammonium salts of alkyl, aryl, or alkylaryl sulfates surfactant are used. The combined amount of the surfactant used is usually from zero to 10% or from 0.5% to 3%, by weight based on the weight of total monomers used for preparing the multistage polymer.

In the multistage free-radical polymerization process for preparing the aqueous dispersion of the multistage polymeric particles, one or more chain transfer agent may be used in one or more stage of the polymerization process. Examples of suitable chain transfer agents include 3-mercaptopropionic acid, methyl mercaptopropionate, butyl mercaptopropionate, n-dodecyl mercaptan, benzenethiol, azelaic alkyl mercaptan, or mixtures thereof. The chain transfer agent may be used in an effective amount to control the molecular weight of polymers in the multistage polymeric particles, for example, the train transfer agent can be used in the polymerization stage of forming the polymer A, the polymerization stage of forming the polymer B, or in both stages. The chain transfer agent may be used in an amount of zero or more, 0.1% or more, 0.15% or more, or even 0.2% or more, and at the same time, 2% or less, 1% or less, 0.5% or less, or even 0.3% or less, by weight based on the total weight of monomers used for preparing the multistage polymeric particles.

The obtained aqueous dispersion of the multistage polymeric particles may be neutralized to a pH value of at least 6, for example, from 6 to 10 or from 7 to 9. Neutralization may be conducted by adding one or more base which may lead to partial or complete neutralization of the ionic or latently ionic groups of the multistage polymer. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, aluminum hydroxide; or mixtures thereof. The process of preparing the aqueous dispersion of the present invention may further comprise adding the polyfunctional carboxylic hydrazide containing at least two hydrazide groups per molecule described above to the aqueous dispersion.

The aqueous dispersion of the multistage polymeric particles of the present invention demonstrates good film formation property with a minimum film formation temperature (MFFT) of greater than 20° C., for example, 25° C. or more, 30° C. or more, 35° C. or more, or even 40° C. or more, and at the same time, 75° C. or less, 70° C. or less, 67° C. or less, or even 65° C. or less. The MFFT is the lowest temperature at which the polymer particles of the aqueous dispersion will mutually coalesce and form a continuous film when the volatile component (for example, water) evaporates. The MFFT can be determined according to the test method described in the Examples section below. The aqueous dispersion of multistage polymeric particles is useful in many applications including, for example, wood coatings, metal coatings, architecture coatings, and traffic paints.

The present invention also relates to an aqueous coating composition comprising the aqueous dispersion of multistage polymeric particles. The aqueous coating composition may also comprise one or more pigment. Pigments may include particulate inorganic materials which are capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. The aqueous coating composition may also comprise one or more extender. Extenders may include particulate inorganic materials typically having a refractive index of less than or equal to 1.8 and greater than 1.5. Examples of suitable extenders include calcium carbonate, aluminum oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The pigments and/or extenders may be present in an amount of zero or more, 5% or more, 10% or more, or even 15% or more, and at the same time, 40% or less, 30% or less, 25% or less, or even 20% or less, by weight based on the total weight of the aqueous coating composition.

The aqueous coating composition of the present invention may further comprise one or more defoamer. "Defoamer" herein refers to a chemical additive that reduces and hinders the formation of foam. Defoamers may be silicone-based defoamers, mineral oil-based defoamers, ethylene oxide/propylene oxide-based defoamers, alkyl polyacrylates, or mixtures thereof. The defoamer may be present in an amount of zero or more, 0.01% or more, or even 0.1% or more, and at the same time, 2% or less, 1.5% or less, or even 1% or less, by weight based on the total weight of the aqueous coating composition, The aqueous coating composition of the present invention may further comprise one or more thickener (also known as "rheology modifier"). Thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferred thickener is based on HEUR. The thickener may be present in an amount of zero or more, 0.01% or more, or even 0.1% or more, and at the same time, 5% or less, 4% or less, or even 3% or less, by weight based on the total weight of the aqueous coating composition.

The aqueous coating composition of the present invention may further comprise one or more wetting agent. "Wetting agent" herein refer to a chemical additive that reduces the surface tension of a coating composition, causing the aqueous coating composition to more easily spread across or penetrate the surface of a substrate. Wetting agents may be polycarboxylates, anionic, zwitterionic, or non-ionic. The wetting agent may be present in an amount of zero or more, 0.01% or more, or even 0.1% or more, and at the same time, 5% or less, 4% or less, or even 3% or less, by weight based on the total weight of the aqueous coating composition.

The aqueous coating composition of the present invention may further comprise one or more coalescent. "Coalescent" herein refer to a slow-evaporating solvent that fuses polymer particles into a continuous film under ambient condition. Suitable coalescents may include, for example, 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescent may be present in an amount of zero or more, 0.1% or more, or even 1% or more, and at the same time, 12% or less, 10% or less, or even 9% or less, by weight based on the total weight of the aqueous coating composition.

In addition to the components described above, the aqueous coating composition of the present invention may further comprise any one or any combination of more than one type of the following additives: buffers, neutralizers, dispersants, humectants, biocides, anti-skinning agents, colorants, flowing agents, anti-oxidants, plasticizers, freeze/thaw additives, leveling agents, thixotropic agents, adhesion promoters, anti-scratch additives, and grind vehicles. These additives may be present in a combined amount of zero or more, 0.001% or more, or even 0.1% or more, and at the same time, 5% or less, 3% or less, or even 2% or less, by weight based on the total weight of the aqueous coating composition.

The aqueous coating composition of the present invention may be prepared with techniques known in the coating art, for example, by admixing the aqueous dispersion comprising the multistage polymeric particles with other optional components described above. Components in the aqueous coating composition may be mixed in any order to provide the aqueous coating composition of the present invention. Any of the above-mentioned optional components may also be added to the composition during or prior to the mixing to form the aqueous coating composition. The aqueous coating composition can be a one-component waterborne wood coating composition.

The present invention also provides a method of preparing a coating. The method may comprise: forming the aqueous coating composition, applying the aqueous coating composition to a substrate, and drying, or allowing to dry, the applied coating composition to form the coating. The aqueous coating composition can be applied to a substrate by incumbent means including brushing, dipping, rolling and spraying. The aqueous coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the coating composition can dry, or allow to dry, to form a film (this is, coating) at room temperature (20-25° C.), or at an elevated temperature, for example, from 35 to 60° C. The aqueous coating composition can provide the coating obtained therefrom (that is, the film obtained after drying, or allowing to dry, the aqueous coating composition applied to a substrate) and the coated substrate with excellent resistance to hot water at 70° C. or more, at 80° C. or more, or at temperatures between 90 and 100° C., with rating of 4 or more. The coating and the coated substrate can also demonstrate alcohol resistance (48% aqueous ethanol solution, 1 hour) with rating of 4 or more, alkali resistance (10% aqueous sodium carbonate solution, 16 hours) with rating of 4 or more, and acetic acid resistance (10% aqueous glacial acetic acid solution, 16 hours) with rating of 3 or more or even 4 or more. These properties may be measured according to the test methods described in the Examples section below.

The aqueous coating composition of the present invention can be applied to, and adhered to, various substrates. Examples of suitable substrates include concrete, cementious substrates, wood, metals, stones, elastomeric substrates, glass or fabrics; preferably, wood. The aqueous coating composition is suitable for various coating applications, such as architecture coatings, marine and protective coatings, automotive coatings, wood coatings including furniture coatings, joinery coatings, and floor coatings, coil coatings, traffic paints, and civil engineering coatings. The aqueous coating composition can be used alone, or in combination with other coatings to form multi-layer coatings.

EXAMPLES

Some embodiments of the invention will now be described in the following Examples, wherein all parts and percentages are by weight unless otherwise specified. The materials used in the examples and their abbreviations are given as below:

Methacrylic acid (MAA), acrylic acid (AA), methyl methacrylate (MMA), butyl acrylate (BA), styrene (ST), 2-ethylhexyl acrylate (2-EHA), divinyl benzene (DVB) and allyl methacrylate (ALMA) are all available from Sinoreagent Group.

Diacetone acrylamide (DAAM) and Adipic acid hydrazide (ADH) are both available from Shandong Heda.

Acetoacetoxyethyl methacrylate (AAEM) is available from The Dow Chemical Company.

Phosphoethyl methacrylate (PEM) is available from Solvay.

DOWANOL™ DPnB (dipropylene glycol n-butyl ether) and DOWANOL EB (ethylene glycol monobutyl ether), available from The Dow Chemical Company, are used as coalescents.

Tego Airex 902w defoamer and Tego Glide 410 polyether siloxane copolymer anti-block additive are both available from Evonik.

BYK-346 polyether modified siloxane, available from BYK, is used as a wetting agent.

ACRYSOL™ RM-8W nonionic urethane rheology modifier is available from The Dow Chemical Company.

ACRYSOL and DOWANOL are trademarks of The Dow Chemical Company.

The following standard analytical equipment and methods are used in the Examples and in determining the properties and characteristics stated herein:

MFFT Measurement

MFFT was measured using a Coesfeld MFFT instrument by casting a 75 μm wet film of an aqueous dispersion sample on a heating plate with gradient temperature. The film was dried and the minimum temperature at which a coherent film formed is recorded as the MFFT.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Hot Water Resistance

Black wood substrate was applied with two-layer coatings by applying 80-90 g/m$^2$ of a test coating composition for each layer. After the first coat, panels were left at room temperature for 4 hours and then sanded with sand paper. After the second coat, panels were allowed to dry at room temperature for 4 hours then in an oven at 50° C. for 48 hours to give coated panels for the hot water resistance test.

First, 10-20 mL of boiling water were applied to the surface of the coated panels, and then a stainless steel cup filled with 350-500 mL of boiling water was placed on top of the coated panels so that boiling water resided between the bottom of the cup and the coated panels. After 30 minutes, the cup was removed and water residue on the coated panels was wiped by tissue. After 1 hour, trace left on the surface of the coated panels was rated as the scale of 0-5, where 0 is the worst, and 5 is the best.

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

Acceptable hot water resistance is 4 or higher.

Alcohol Resistance, Acetic Acid Resistance and Alkaline Resistance Tests

Preparation of panels: Panels were prepared by brush applying three coats at 80-90 g/m$^2$ over each type of wood. After the first coat, panels were left at room temperature for 4 hours then sanded with sand paper. After the second coat, panels were allowed to dry at room temperature for 4 hours and then in an oven at 50° C. for 48 hours before running the following tests, respectively.

Alcohol resistance test: Filter discs were saturated with an aqueous ethanol solution (48%), placed on the finished panels, and covered with a cap to reduce evaporation. After 1 hour, the cap was removed. Tested areas were wiped with wet facial tissues and allowed to dry at room temperature to observe the damage degree.

Acid resistance test: Filter discs were saturated with an aqueous an aqueous glacial acetic acid solution (10%), placed on the finished panels, and covered with a cap to reduce evaporation. After 16 hours, the cap was removed. Tested areas were wiped with wet facial tissues and allowed to dry at room temperature to observe the damage degree.

Alkali resistance test: Filter discs were saturated with an aqueous sodium carbonate (Na$_2$CO$_3$) solution (10%), placed on the finished panels, and covered with a cap to reduce evaporation. After 16 hours, the cap was removed. Tested areas were wiped with wet facial tissues and allowed to dry at room temperature to observe the damage degree.

Degree of damage for the alcohol resistance, acetic acid resistance and alkaline resistance tests, respectively, is rated as the scale of 0-5, where 0 is the worst, and 5 is the best, as follows:

5—No change: Test area indistinguishable from adjacent surrounding area;

4—Minor change: Test area distinguishable from adjacent surrounding area, only when the light source is directed on the test surface and reflected towards the observer's eye. The minor change could be some slight discoloration and change in gloss, but no change in the surface structure such as swelling, fiber raising, cracking and/or blistering;

3—Moderate change: Test area distinguishable from adjacent surrounding area, visible in several viewing directions, for example, discoloration; change in gloss and color; but no change in the surface structure such as swelling, fiber raising, cracking and/or blistering;

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

The higher the rating level, the better the resistance. Acceptable acetic acid resistance is 3 or higher. Acceptable alkaline resistance is 4 or higher. Acceptable alcohol resistance is 3 or higher.

Pendulum Hardness

The pendulum (Konig) hardness was measured on a coated glass panel using BYK Pendulum hardness tester, according to ASTM D4366-16. Test results were reported in seconds. A test coating composition was applied to a glass panel with a 120 µm wet film, dried at room temperature for 4 hours, and then placed into an oven at 50° C. for 2 days to form the coated glass panel for pendulum hardness measurement.

Flexibility Test

Conical flexibility was conducted to evaluate the ability of a coating film to resist cracking in accordance with GB/T 1731-1993. A test coating composition was drawn down on tinplate with a wet film thickness of 120 µm and then dried at 50° C. for 2 days prior to the test.

Impact Resistance

Impact resistance of a coating film was conducted in accordance with ASTM 2974. A test coating composition was directly drawn down onto tinplate with a wet film thickness of 120 µm and then dried at 50° C. for 2 days prior to the test.

Examples (Exs) 1-3 and 5 and Comparative (Comp) Exs 1-4 and 6 Multistage Polymer (MP) Dispersions Preparation of Monomer Emulsion 1 (ME1): SLS surfactant (14.25 g, 25% active) was dissolved in deionized (DI) water (181.4 g), with stirring, and then monomers listed in Table 1 or 2 were slowly added to the agitated solution to get the ME1.

Preparation of Monomer Emulsion 2 (ME2): SLS surfactant (14.38 g, 25% active) was dissolved in DI water (171.96 g), with stirring, and then monomers listed in Table 1 or 2 were slowly added to the agitated solution to get the ME2.

A solution containing SLS surfactant (23.87 g, 25% active) and DI water (630.7 g) was placed in a 5 liter 4-neck round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous ammonia persulfate (APS) initiator solution (1.84 g APS in 23.8 g DI water), and 5% of the ME1 were added to the flask. In about 5 minutes, initiation of polymerization was confirmed by the increase of temperature by 3° C. and a change of the external appearance of the reaction mixture. After generation of heat had ended, the remainder of the ME1 was added gradually to the flask over a period of 45 minutes, with stirring. At the same time, an aqueous APS solution (0.9 g APS in 67.30 g DI water) was added gradually to the flask over 45 minutes. Polymerization reaction temperature was maintained at 84 to 86° C. After completing the addition, the vessel that containing the ME1 and the feeding pipes leading into the flask were rinsed with DI water (20.4 g), and the rinse was added back to the flask. After that, the reaction mixture was hold at 82-86° C. for 30 minutes.

The ME2 was then added in the same manner as the ME1 over 45 minutes. At the same time, an aqueous APS solution (0.9 g APS in 67.30 g DI water) was added gradually to the flask over a period of 45 minutes. Upon completing the addition, the reaction mixture was hold at 70° C. for 60 minutes. An aqueous solution of t-BHP (1.63 g, 70% active) in 27.2 g DI water and an aqueous solution of IAA (0.82 g, in 30.6 g DI water) were then added into the flask. The reaction was cooled to 50° C. and then neutralized to pH 7.0-8.0 by ammonia (25%). The reaction mixture was held at 45 to 50° C. for 10 minutes. Then ADH slurry (15.00 g in 28 g DI water) was added at 40° C. over 10 minutes and held for 20 minutes. The resulting dispersion was cooled to room temperature and filtered to obtain the aqueous polymer dispersion.

Ex 4 MP Dispersion

Preparation of Monomer Emulsion 1 (ME1): SLS surfactant (11.40 g, 25% active) was dissolved in DI water (129.12 g), with stirring, and then monomers listed in Table 1 were slowly added to the agitated solution to get the ME1.

Preparation of Monomer Emulsion 2 (ME2): SLS surfactant (17.24 g, 25% active) was dissolved in DI water (206.18 g), with stirring, and then monomers listed in Table 1 were slowly added to the agitated solution to get the ME2.

A solution containing SLS surfactant (23.87 g, 25% active) and DI water (630.7 g) was placed in a 5 liter 4-neck round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous APS initiator solution (1.84 g APS in 23.8 g DI water), and 5% of the ME1 were added to the flask. In about 5 minutes, initiation of polymerization was confirmed by the increase of temperature by 3° C. and a change of the external appearance of the reaction mixture. After generation of heat had ended, the remainder of the ME1 was added gradually to the flask over 36 minutes, with stirring. At the same time, an aqueous APS solution (0.68 g APS in 53.86 g DI water) was added gradually to the flask over a period of 36 minutes. Polymerization reaction temperature was maintained at 84 to 86° C. After completing the addition, the vessel that containing the ME1 and the feeding pipes leading into the flask were rinsed with 20.4 g DI water, and the rinse was added back to the flask. After that, the reaction mixture was hold at 82-86° C. for 30 minutes.

The ME2 was then added in the same manner as the ME1 over 54 minutes. At the same time, an aqueous APS solution (1.02 g APS in 80.78 g DI water) was added gradually to the flask over a period of 54 minutes. Upon completing the addition, the reaction mixture was hold at 70° C. for 60 minutes. An aqueous solution of t-BHP (1.63 g, 70% active) in 27.2 g DI water and an aqueous solution of IAA (0.82 g, in 30.6 g DI water) were then added into the flask. The reaction was cooled to 50° C. and then neutralized to pH 7.0-8.0 by ammonia (25%). The reaction mixture was held at 45 to 50° C. for 10 minutes. Then ADH slurry (17.90 g in 28 g DI water) was added at 40° C. over 10 minutes and held for 20 minutes. The resulting dispersion was cooled to room temperature and filtered to obtain the aqueous polymer dispersion.

Ex 6 MP Dispersion

Preparation of Monomer Emulsion 1 (ME1): SLS surfactant (15.68 g, 25% active) was dissolved in DI water (177.54 g), with stirring, and then monomers listed in Table 1 were slowly added to the agitated solution to get the ME1.

Preparation of Monomer Emulsion 2 (ME2): SLS surfactant (12.94 g, 25% active) was dissolved in DI water (154.76 g), with stirring, and then monomers listed in Table 1 were slowly added to the agitated solution to get the ME2.

A solution containing SLS surfactant (23.87 g, 25% active) and DI water (630.7 g) was placed in a 5 liter 4-neck round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous APS initiator solution (1.84 g APS in 23.8 g DI water), and 5% of the ME1 were added to the flask. In about 5 minutes, initiation of polymerization was confirmed by the increase of temperature by 3° C. and a change of the external appearance of the reaction mixture. After generation of heat had ended, the remainder of the ME1 was added gradually to the flask over 50 minutes, with stirring. At the same time, an aqueous APS solution (0.95 g APS in 74.80 g DI water) was added gradually to the flask over a period of 50 minutes. Polymerization reaction temperature was maintained at 84 to 86° C. After completing the addition, the vessel that containing the ME1 and the feeding pipes leading into the flask were rinsed with 20.4 g DI water, and the rinse was added back to the flask. After that, the reaction mixture was hold at 82-86° C. for 30 minutes.

The ME2 was then added in the same manner as the ME1 over 40 minutes. At the same time, an aqueous APS solution (0.76 g APS in 59.84 g DI water) was added gradually to the flask over a period of 40 minutes. Upon completing the addition, the reaction mixture was hold at 70° C. for 60 minutes. An aqueous solution of t-BHP (1.63 g, 70% active) in 27.2 g DI water and an aqueous solution of IAA (0.82 g, in 30.6 g DI water) were then added into the flask. The reaction was cooled to 50° C. and then neutralized to pH 7.0-8.0 by ammonia (25%). The reaction mixture was held at 45 to 50° C. for 10 minutes. Then ADH slurry (13.43 g in 28 g DI water) was added at 40° C. over 10 minutes and held for 20 minutes. The resulting dispersion was cooled to room temperature and filtered to obtain the aqueous polymer dispersion.

Comp Ex 5 MP Dispersion

Comp Ex 5 was prepared substantially the same as Example 5 of US20020013405A1:

Preparation of Monomer Emulsion 1 (ME1): SLS surfactant (9.50 g, 25% active) was dissolved in DI water (114.67 g), with stirring, and then EHA (42.85 g), MMA (352.26 g), DVB (4.77 g) and AA (4.77 g) were slowly added to the agitated solution to get the ME1.

Preparation of Monomer Emulsion 2 (ME2): SLS surfactant (9.50 g, 25% active) was dissolved in DI water (114.67 g), with stirring, and then MMA (292.74 g), EHA (107.10 g) and AA (4.77 g) were slowly added to get the ME2.

Preparation of Monomer Emulsion (ME3): SLS surfactant (9.50 g, 25% active) was dissolved in DI water (114.67 g), with stirring, and then MMA (107.12 g), EHA (233.25 g), DAAM (35.72 g) and AA (4.76 g) were slowly added to the agitated solution to get the ME3.

A solution containing SLS surfactant (23.87 g, 25% active) and DI water (630.7 g) was placed in a 5 liter 4-neck round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous APS initiator solution (1.84 g APS in 23.8 g DI water), and 5% of the ME1 were added to the flask. In about 5 minutes, initiation of polymerization was confirmed by the increase of temperature by 3° C. and a change of the external appearance of the reaction mixture. After generation of heat had ended, the remainder of the ME1 was added gradually to the flask over 30 minutes, with stirring. At the same time, an aqueous APS solution (0.57 g APS in 44.88 g DI water) was added gradually to the flask over a period of 30 minutes. Polymerization reaction temperature was maintained at 84 to 86° C. After completing the addition, the vessel that containing the ME1 and the feeding pipes leading into the flask were rinsed with DI water (20.4 g), and the rinse was added back to the flask. After that, the ME2 was then added in the same manner as the ME1 over 30 minutes. At the same time, an aqueous APS solution (0.57 g APS in 44.88 g DI water) was added gradually to the flask over a period of 30 minutes. After completing the addition, the vessel that containing the ME2 and the feeding pipes leading into the flask were rinsed with DI water (20.4 g), and the rinse was added back to the flask. After that, the ME3 was then added in the same manner as the ME1 over 30 minutes. At the same time, an aqueous APS solution (0.57 g APS in 44.88 g DI water) was added gradually to the flask over 30 minutes. Upon completing the addition, the reaction mixture was hold at 70° C. for 60 minutes. An aqueous solution of t-BHP (1.63 g, 70% active) in DI water (27.2 g) and an aqueous solution of IAA (0.82 g, in 30.6 g DI water) were then added into the flask. The reaction was cooled to 50° C. and then neutralized to pH 7.0-8.0 by ammonia (25%). The reaction mixture was held at 45 to 50° C. for 10 minutes. Then ADH slurry (17.86 g in 28 g DI water) was added at 40° C. over 10 minutes and held for 20 minutes. The resulting dispersion was cooled to room temperature and filtered to obtain the aqueous polymer dispersion (Tgs for each stage polymer: 67.5/44.1/−7.1° C., MFFT: 56.7° C., average particle size: 80 nm, and solids: 45.3%).

Comp Ex 7 MP Dispersion

Comp Ex 7 was prepared as Ex 1, except the ADH dosage was 29.85 g in 28 g DI water, based on monomer compositions given in Table 2.

Comp Ex 8 MP Dispersion

Preparation of Monomer Emulsion 1 (ME1): SLS surfactant (17.10 g, 25% active) was dissolved in DI water (193.68 g), with stirring, and then monomers listed in Table 2 were slowly added to the agitated solution to get the ME1.

Preparation of Monomer Emulsion 2 (ME2): SLS surfactant (11.49 g, 25% active) was dissolved in DI water (137.40 g), with stirring, and then monomers listed in Table 2 were slowly added to the agitated solution to get the ME2.

A solution containing SLS surfactant (23.87 g, 25% active) and DI water (630.7 g) was placed in a 5 liter 4-neck round-bottom flask equipped with a thermocouple, a cooling condenser and an agitator, and heated to 85° C. under nitrogen. An aqueous sodium carbonate solution (1.84 g sodium carbonate in 61.20 g DI water), an aqueous APS initiator solution (1.84 g APS in 23.8 g DI water), and 5% of the ME1 were added to the flask. In about 5 minutes, initiation of polymerization was confirmed by the increase of temperature by 3° C. and a change of the external appearance of the reaction mixture. After generation of heat had ended, the remainder of the ME1 was added gradually to the flask over 54 minutes, with stirring. At the same time, an aqueous APS solution (1.02 g APS in 80.78 g DI water) was added gradually to the flask over a period of 54 minutes.

Polymerization reaction temperature was maintained at 84 to 86° C. After completing the addition, the vessel that containing the ME1 and the feeding pipes leading into the flask were rinsed with 20.4 g DI water, and the rinse was added back to the flask. After that, the reaction mixture was hold at 82-86° C. for 30 minutes.

The ME2 was then added in the same manner as the ME1 over 36 minutes. At the same time, an aqueous APS solution (0.68 g APS in 53.86 g DI water) was added gradually to the flask over a period of 36 minutes. Upon completing the addition, the reaction mixture was hold at 70° C. for 60 minutes. An aqueous solution of t-BHP (1.63 g, 70% active) in 27.2 g DI water and an aqueous solution of IAA (0.82 g, in 30.6 g DI water) were then added into the flask. The reaction was cooled to 50° C. and then neutralized to pH 7.0-8.0 by ammonia (25%). The reaction mixture was held at 45 to 50° C. for 10 minutes. Then ADH slurry (11.93 g in 28 g DI water) was added at 40° C. over 10 minutes and held for 20 minutes. The resulting dispersion was cooled to room temperature and filtered to obtain the aqueous polymer dispersion.

Properties of the MP dispersions prepared above were given in Tables 1 and 2.

TABLE 1

Monomer compositions and properties for Exs 1-6 MP dispersions

| | | Ex 1 | Ex 2 | Ex 3 | Ex 4 | Ex 5 | Ex 6 |
|---|---|---|---|---|---|---|---|
| MP dispersion | | | | | | | |
| ME1 for | MMA | 422.45 | 416.8 | 428.31 | 337.96 | 422.45 | 464.7 |
| preparing | ALMA | 29.55 | 29.55 | 29.55 | 23.64 | 29.55 | 32.51 |
| polymer A | DVB | 0 | 0 | 0 | 0 | 0 | 0 |
| (Monomer | MAA | 11.72 | 11.72 | 0 | 9.38 | 11.72 | 12.89 |
| Composition | DAAM | 0 | 5.65 | 0 | 0 | 0 | 0 |
| A), gram | AA | 0 | 0 | 0 | 0 | 0 | 0 |
| | BA | 130.65 | 130.65 | 130.65 | 104.52 | 130.65 | 143.72 |
| | PEM | 0 | 0 | 5.86 | 0 | 0 | 0 |
| ME2 for | MMA | 262.05 | 262.05 | 273.82 | 314.2 | 232.26 | 235.85 |
| preparing | EHA | 280.21 | 280.21 | 280.21 | 335.97 | 280.21 | 252.19 |
| polymer B | DAAM | 29.85 | 29.85 | 29.85 | 35.79 | 59.7 | 26.87 |
| (Monomer | MAA | 23.54 | 23.54 | 0 | 28.23 | 23.54 | 21.19 |
| Composition | AAEM | 0 | 0 | 0 | 0 | 0 | 0 |
| B), gram | PEM | 0 | 0 | 11.77 | 0 | 0 | 0 |
| | AA | 0 | 0 | 0 | 0 | 0 | 0 |
| Properties | | | | | | | |
| Tg of polymer A//Tg of polymer B, ° C. | | 56.8//16.3 | 56.9//16.3 | 55.6//13.7 | 56.8//16.3 | 56.8//16.4 | 56.8//16.3 |
| MFFT, ° C. | | 58.5 | 60 | 61 | 44 | 64 | 67 |
| Average PS, nm | | 97 | 99 | 172 | 96 | 98 | 94 |
| Solids, % | | 44.6 | 44.95 | 44.48 | 44.97 | 44.54 | 44.54 |

[1]Solids content was measured by weighting 0.7 ± 0.1 g of a sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3". "W3 − W2" refers to dry or solids weight of the sample. Solids content is calculated by (W3 − W2)/W1*100%.
[2]Average PS: Average particle size was measured by Brookhaven BI-90 Plus Particle Size Analyzer

TABLE 2

Monomer compositions and properties for comparative MP dispersions

| | | Comp Ex 1 | Comp Ex 2 | Comp Ex 3 | Comp Ex 4 | Comp Ex 6 | Comp Ex 7 | Comp Ex 8 |
|---|---|---|---|---|---|---|---|---|
| MP dispersion | | | | | | | | |
| ME1 for | MMA | 422.45 | 422.45 | 422.45 | 422.45 | 422.45 | 433.9 | 506.94 |
| preparing | ALMA | 29.55 | 29.55 | 29.55 | 29.55 | 0 | 17.83 | 35.46 |
| polymer A | DVB | 0 | 0 | 0 | 0 | 29.55 | 0 | 0 |
| (Monomer | MAA | 11.72 | 11.72 | 11.72 | 0 | 11.72 | 11.72 | 14.07 |
| Composition | DAAM | 0 | 0 | 0 | 0 | 0 | 0 | 0 |
| A), gram | AA | 0 | 0 | 0 | 11.72 | 0 | 0 | 0 |
| | BA | 130.65 | 130.65 | 130.65 | 130.65 | 130.65 | 130.65 | 156.78 |
| | PEM | 0 | 0 | 0 | 0 | 0 | 0 | 0 |
| ME2 for | MMA | 273.59 | 247.13 | 244.22 | 262.05 | 262.05 | 232.26 | 209.38 |
| preparing | EHA | 292.55 | 265.29 | 285.92 | 280.21 | 280.21 | 280.21 | 223.89 |
| polymer B | DAAM | 5.97 | 0 | 29.85 | 29.85 | 29.85 | 59.7 | 23.85 |
| (Monomer | MAA | 23.54 | 23.54 | 35.74 | 0 | 23.54 | 23.54 | 18.81 |

TABLE 2-continued

| | | Comp Ex 1 | Comp Ex 2 | Comp Ex 3 | Comp Ex 4 | Comp Ex 6 | Comp Ex 7 | Comp Ex 8 |
|---|---|---|---|---|---|---|---|---|
| Composition B), gram | AAEM | 0 | 59.7 | 0 | 0 | 0 | 0 | 0 |
| | PEM | 0 | 0 | 0 | 0 | 0 | 0 | 0 |
| | AA | 0 | 0 | 0 | 23.54 | 0 | 0 | 0 |
| Properties | | | | | | | | |
| Tg of polymer A//Tg of polymer B, °C. | | 56.8//13.2 | 56.8//12 | 56.8//16.4 | 55.9//14.5 | 56.8//16.3 | 56.6//16.4 | 56.8//16.3 |
| MFFT, °C. | | 57 | 55 | 59 | 43.8 | 53 | 59 | 66 |
| Average PS, nm | | 94 | 100 | 100 | 135 | 79 | 90 | 97 |
| Solids, % | | 44.6 | 44.7 | 44.5 | 45.42 | 45.13 | 45.25 | 45.15 |

Coating Compositions

The aqueous dispersions of multistage polymers obtained above were used as binders for preparing coating compositions based on compositions given in Table 3. The binder, DOWANOL EB coalescent, DPnB, BYK346 wetting agent, Tego Airex 902W defoamer, ACRYSOL RM-8W rheology modifier and water were mixed and stirred at 600 rpm/min to form coating compositions. The obtained coating compositions were evaluated according to the test methods described above and results of properties are shown in Table 4.

TABLE 3

Coating Compositions

| Coating composition | Coating 1 and Comp coatings 1-4 | Coating 2 | Coating 3 | Coating 4 | Coating 5 | Coating 6 | Comp coating 5 | Comp coating 6 | Comp coating 7 | Comp coating 8 |
|---|---|---|---|---|---|---|---|---|---|---|
| Binder (MP dispersion) | Ex 1 and Comp Exs 1-4 | Ex 2 | Ex 3 | Ex 4 | Ex 5 | Ex 6 | Comp Ex 5 | Comp Ex 6 | Comp Ex 7 | Comp Ex 8 |
| Binder dosage | 70 | 70 | 70 | 70 | 70 | 70 | 70 | 70 | 70 | 70 |
| Water | 22.6 | 19.6 | 19.5 | 22.1 | 19.1 | 18.6 | 20.6 | 20.6 | 19.6 | 18.6 |
| EB | 3.5 | 4.5 | 4.6 | 3 | 5 | 5 | 4 | 4 | 4.5 | 5 |
| DPnB | 3 | 5 | 5 | 4 | 5 | 5.5 | 4.5 | 4.5 | 5 | 5.5 |
| Tego-902w | 0.3 | 0.3 | 0.3 | 0.3 | 0.3 | 0.3 | 0.3 | 0.3 | 0.3 | 0.3 |
| BYK346 | 0.3 | 0.3 | 0.3 | 0.3 | 0.3 | 0.3 | 0.3 | 0.3 | 0.3 | 0.3 |
| RM-8W | 0.3 | 0.3 | 0.3 | 0.3 | 0.3 | 0.3 | 0.3 | 0.3 | 0.3 | 0.3 |
| Total | 100 | 100 | 100 | 100 | 100 | 100 | 100 | 100 | 100 | 100 |
| Solid (%) | 31.5 | 31.7 | 31.7 | 31.7 | 31.1 | 31.1 | 31.5 | 31.7 | 31.7 | 31.7 |

As shown in Table 4, coating compositions comprising the inventive binders of Exs 1-6 multistage polymer dispersions all provided coatings with surprisingly good hot water resistance (rating ≥4) as well as good alcohol resistance, alkali resistance and acetic acid resistance, and acceptable pendulum hardness, impact resistance, and flexibility. As compared to the binder of Ex 1 multistage polymer dispersion, the binders of Comp Exs 1, 3-6 and 8 all provided coatings with poor hot water resistance, and even poor acetic acid resistance (Comp Ex 1) or alkali resistance (Comp Exs 4 and 5). As compared to the binder of Ex 5, the binder of Comp Ex 2 using AAEM replacing DAAM showed poorer acetic acid resistance and the binder of Comp Ex 7 provided poorer hot water resistance.

TABLE 2

Properties of Coatings

| Coating composition | Binder type | Pendulum hardness | Impact resistance | Flexibility | Alcohol resistance | Alkali resistance | Acetic acid resistance | Hot water resistance |
|---|---|---|---|---|---|---|---|---|
| Coating 1 | Ex 1 | 143 | <5 cm | >15 mm | 4 | 5 | 3 | 5 |
| Coating 2 | Ex 2 | 109 | 5 cm | 10 mm | 4 | 4 | 4 | 5 |
| Coating 3 | Ex 3 | 120 | 15 cm | 2 mm | 4 | 4 | 3 | 4 |
| Coating 4 | Ex 4 | 111 | 5 cm | <1 mm | 4 | 4 | 4 | 5 |
| Coating 5 | Ex 5 | 141 | 5 cm | 5 mm | 4 | 4 | 4 | 4 |
| Coating 6 | Ex 6 | 95 | 5 cm | >15 mm | 4 | 4 | 4 | 4 |
| Comp Coating 1 | Comp Ex 1 | 112 | <5 cm | >15 mm | 4 | 5 | 2 | 2 |
| Comp Coating 2 | Comp Ex 2 | 118 | <5 cm | >15 mm | 4 | 4 | 2 | 4 |
| Comp Coating 3 | Comp Ex 3 | 130 | <5 cm | >15 mm | 4 | 3 | 3 | 3 |
| Comp Coating 4 | Comp Ex 4 | 118 | 5 cm | 10 mm | 4 | 3 | 4 | 3 |
| Comp Coating 5 | Comp Ex 5 | 114 | 10 cm | 3 mm | 4 | 3 | 4 | 1 |
| Comp Coating 6 | Comp Ex 6 | 111 | 5 cm | 2 mm | 4 | 4 | 4 | 1 |
| Comp Coating 7 | Comp Ex 7 | 136 | 10 cm | <1 | 4 | 4 | 4 | 2 |
| Comp Coating 8 | Comp Ex 8 | 115 | 5 cm | 10 | 4 | 4 | 4 | 2 |

What is claimed is:

1. An aqueous dispersion comprising multistage polymeric particles, wherein the multistage polymeric particles comprise, by weight based on the weight of the multistage polymeric particles, from 38% to 58% of a polymer A with a glass transition temperature of greater than 47° C. and from 42% to 62% of a polymer B with a glass transition temperature of 40° C. or less,
   wherein the polymer A comprises, by weight based on the weight of the polymer A,
   structural units of a multifunctional monomer containing two or more different ethylenically unsaturated polymerizable groups,
   from zero to 6% of structural units of diacetone (meth) acrylamide,
   structural units of a monoethylenically unsaturated nonionic monomer, and optionally
   structural units of an acid monomer and/or a salt thereof selected from the group consisting of methacrylic acid, a phosphorous-containing acid monomer or a salt thereof, or mixtures thereof;
   wherein the polymer B comprises, by weight based on the weight of the polymer B,
   from 1.1% to 15% of structural units of diacetone (meth) acrylamide,
   structural units of an acid monomer and/or a salt thereof selected from the group consisting of methacrylic acid, a phosphorous-containing acid monomer or a salt thereof, or mixtures thereof, and
   structural units of a monoethylenically unsaturated nonionic monomer; and
   wherein the multistage polymeric particles comprise, by weight based on the weight of the multistage polymeric particles, structural units of the acid monomer and salt thereof in a total amount of from 0.1% to 3.9%, and structural units of the multifunctional monomer in a total amount of greater than 1.5% to 5%;
   wherein the aqueous dispersion further comprises a polyfunctional carboxylic hydrazide containing at least two hydrazide groups per molecule.

2. The aqueous dispersion of claim 1, wherein the multistage polymeric particles comprise structural units of diacetone (meth) acrylamide in a total amount of from 1.5% to 6% by weight based on the weight of the multistage polymeric particles.

3. The aqueous dispersion of claim 1, wherein the polymer B comprises, by weight based on the weight of the polymer B, from 3% to 12% of structural units of diacetone (meth) acrylamide.

4. The aqueous dispersion of claim 1, wherein the polymer A comprises, by weight based on the weight of the polymer A, from 3.1% to 12% of structural units of the multifunctional monomer.

5. The aqueous dispersion of claim 1, wherein the multifunctional monomer is selected from the group consisting of allyl (meth) acrylate, allyl (meth) acrylamide, allyl oxyethyl (meth) acrylate, crotyl (meth) acrylate, dicyclopentenyl (meth) acrylate, dicyclopentenyl ethyl (meth) acrylate, diallyl maleate, or mixtures thereof.

6. The aqueous dispersion of claim 1, wherein the polyfunctional carboxylic hydrazide is selected from the group consisting of adipic dihydrazide, oxalic dihydrazide, isophthalic dihydrazide, polyacrylic polyhydrazides, or mixtures thereof.

7. The aqueous dispersion of claim 1, wherein the polymer B comprises, by weight based on the weight of the polymer B, from 0.2% to 5.5% of structural units of the acid monomer and salt thereof.

8. The aqueous dispersion of claim 1, the polymer A comprises, by weight based on the weight of the polymer A, from 0.1% to 3% of structural units of the acid monomer and salt thereof.

9. The aqueous dispersion of claim 1, wherein the acid monomer is methacrylic acid, phosphoethyl methacrylate, or a mixture thereof.

10. The aqueous dispersion of claim 1, wherein the multistage polymeric particles have a glass transition temperature in the range of from 0 to 70° C.

11. The aqueous dispersion of claim 1, having a minimum film formation temperature of from 20 to 75° C.

12. A process for preparing the aqueous dispersion of claim 1, comprising: forming the multistage polymeric particles by multistage free-radical polymerization, comprising at least one stage of polymerization forming the polymer A and at least one stage of polymerization forming the polymer B, and further adding the polyfunctional carboxylic hydrazide containing at least two hydrazide groups per molecule.

13. An aqueous coating composition comprising the aqueous dispersion of claim 1.

14. The aqueous coating composition of claim 13 wherein a coating formed from the composition has a hot water resistance of 4 or higher.

15. The aqueous coating composition of claim 14 wherein the coating has an alcohol resistance of 4 or higher, an alkali resistance of 4 or higher, and an acetic acid resistance of 3 or higher.

16. The aqueous dispersion of claim 1 wherein total amount of the multifunctional monomer is from 1.6 to 5%.

* * * * *